United States Patent
Treskog et al.

[11] Patent Number: 5,911,281
[45] Date of Patent: Jun. 15, 1999

[54] PNEUMATIC POWER TOOL

[75] Inventors: Erik Olof Treskog, Saltsjö-Boo; Lars-Johan Olov Larsson, Spånga, both of Sweden

[73] Assignee: Atlas Copco Tools AB, Nacka, Sweden

[21] Appl. No.: 08/888,417

[22] Filed: Jul. 7, 1997

[30] Foreign Application Priority Data

Jul. 9, 1996 [SE] Sweden ................................. 9602715

[51] Int. Cl.⁶ ........................... B25F 5/02; B23B 45/00
[52] U.S. Cl. .................... 173/104; 173/117; 173/217; 310/50; 310/60 R; 60/695
[58] Field of Search .................... 173/104, 117, 173/217, DIG. 2; 227/130, 131; 60/456, 694, 695, 912; 310/50, 52, 60 R, 86, 341, 350; 91/47, 48, 52, DIG. 2

[56] References Cited

U.S. PATENT DOCUMENTS

| | | | |
|---|---|---|---|
| 1,593,615 | 7/1926 | Zimmerman et al. | 60/694 |
| 1,712,437 | 5/1929 | Jimerson | 60/695 |
| 2,080,973 | 5/1937 | Speth . | |
| 2,273,626 | 2/1942 | Connell . | |
| 2,320,340 | 6/1943 | Appton | 60/695 |
| 2,351,740 | 6/1944 | Blum | 60/695 |
| 2,456,571 | 12/1948 | Turner et al. | 310/50 |
| 3,172,121 | 3/1965 | Doyle et al. | 173/117 |
| 3,848,145 | 11/1974 | Goebel et al. | 310/60 R |
| 4,154,309 | 5/1979 | Sappington . | |
| 5,299,392 | 4/1994 | Jacobsson et al. . | |
| 5,419,737 | 5/1995 | Brazell et al. . | |
| 5,715,986 | 2/1998 | Sauer | 227/130 |

FOREIGN PATENT DOCUMENTS

3048519 A1  7/1982  Germany .

*Primary Examiner*—Scott A. Smith
*Attorney, Agent, or Firm*—Frishauf, Holtz, Goodman, Langer & Chick

[57] ABSTRACT

A pneumatically or electrically powered power tool having a rotating working implement carrying output spindle (14), an exhaust or cooling air outlet passage (21), air outlet openings communicating the outlet air to the atmosphere and comprising a first section (22) located on one side of the tool housing (10, 20) and a second section (23) located on an other side of the housing (10, 20), and an air outlet flow directing valve (25) shiftable between a first condition in which it directs the air flow out through the first opening section (22) and a second condition in which it directs the air flow out through the second opening section (23). The air outlet flow directing valve (25) is shiftable by a maneouver mechanism (35, 36) including a rotatable annular handle (35) on the outside of the housing (10, 20) between the first and second conditions in which it alternatively directs the outlet air flow through the first and second outlet opening sections (22, 23).

20 Claims, 3 Drawing Sheets

PNEUMATIC POWER TOOL

The invention pertains to power tools of the type having either a pressure air driven motor developing an exhaust air outlet flow or an electric motor with a fan boosted cooling air circulation generating a cooling air outlet flow.

The invention is primarily intended for power tools for grinding and cutting operations where the operator is exposed to dust and chips produced during operation of the tool. A problem arising in connection with tools is the influence of the air flow leaving the tool through outlet openings located adjacent to the contact area between the working implement and the work piece. Such an air flow often causes dust and chips to be whirled up and circulated at the work site, thereby impairing the environment in general and the environment for the tool operator in particular.

BACKGROUND OF THE INVENTION

A power tool of the above mentioned type is previously described in, for instance, U.S. Pat. No. 5,299,392. The pneumatic grinder shown in this patent comprises an exhaust air outlet passage 19 and a silencer 20 formed as a chamber with a number of outlet openings. At least in certain working positions of the tool, the exhaust air outlet flow through these openings causes dust and chips to be whirled up and circulated at the work site.

Another drawback of some prior art tools of this type is that in certain working positions of the tool the air outlet flow may hit the operator in the face and cause serious inconvenience for him or her, particularly when the air flow carries dust and particles derived from the working process.

A particular problem concerned with pneumatic power grinders is the low temperature of the exhaust air leaving the tool, usually −40° to −50° C. Such a cold air flow is not only very unpleasant but also unhealthy during operation of the tool. During operation of heavier straight type pneumatic grinders, moreover the operator very often is hit by this cold air flow on parts of his body or on his legs, because this type of machine is powerful enough to require extra support by, for instance, the operators leg or other body part.

In U.S. Pat. No. 2,080,973 there is described a straight type pneumatic grinder having a laterally directed exhaust air outlet 50 on the housing. Depending on the working position, the exhaust air from this outlet may cause an annoying air flow in front of the operators face which could be hazardous to the handling of the tool, or an unhealthy cold air flow may be directed to other parts of the operators body.

In U.S. Pat. No. 2,273,626 there is shown an electrically driven angle grinder provided with a fan boosted air cooling system including an air outlet on top of the tool housing. In certain working positions, the air outlet flow through this outlet may hit the operator in the face and cause serious inconvenience for him or her.

OBJECT OF THE INVENTION

The object of the invention is to solve the above described problems by providing an improved power tool having air outlet openings divided into two sections located on two separate sides of the tool housing, an outlet flow directing valve which is shiftable between a first condition in which the outlet air flow is directed through one of the outlet opening sections only and a second condition in which the outlet air flow is directed through the other outlet opening section only, and a control unit supported on the housing for manual shifting of the valve between the first condition and the second condition.

Further characteristics and advantages of the invention will appear from the following specification.

A preferred embodiment of the invention is below described in detail with reference to the accompanying drawings.

DETAILED DESCRIPTION

Figure 1:
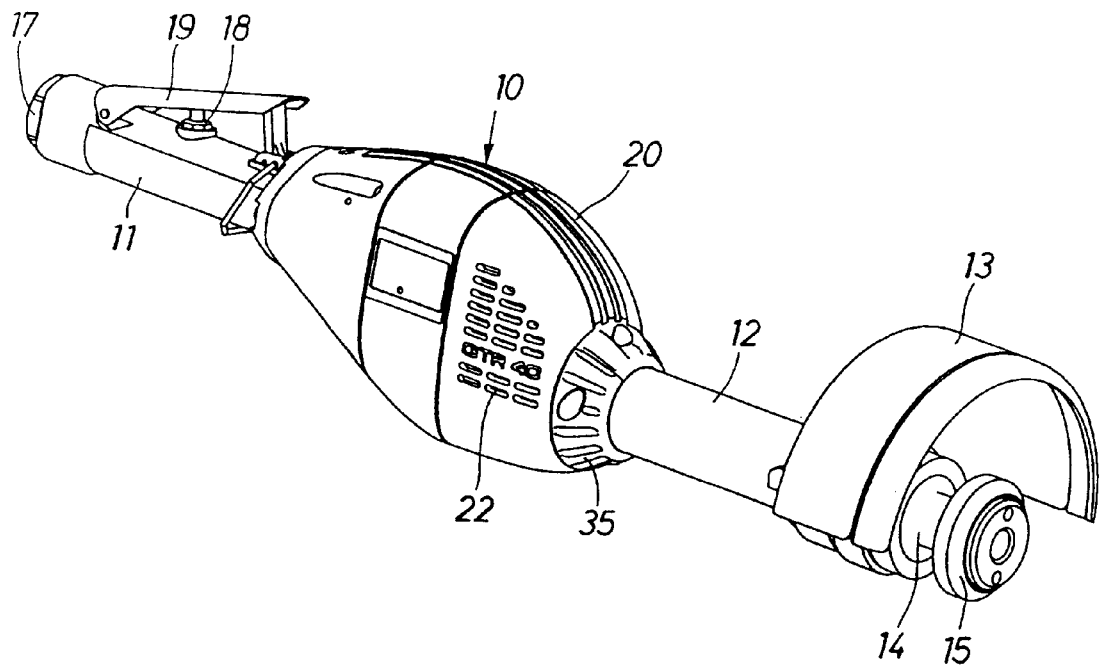
FIG. 1 shows a perspective view of a power tool according to the invention, illustrating the right hand side of the tool.

The power tool shown in the drawing figures is a straight type power grinder having a pneumatic motor (not shown) for rotating a working implement such as a grinding wheel.

Figure 2:
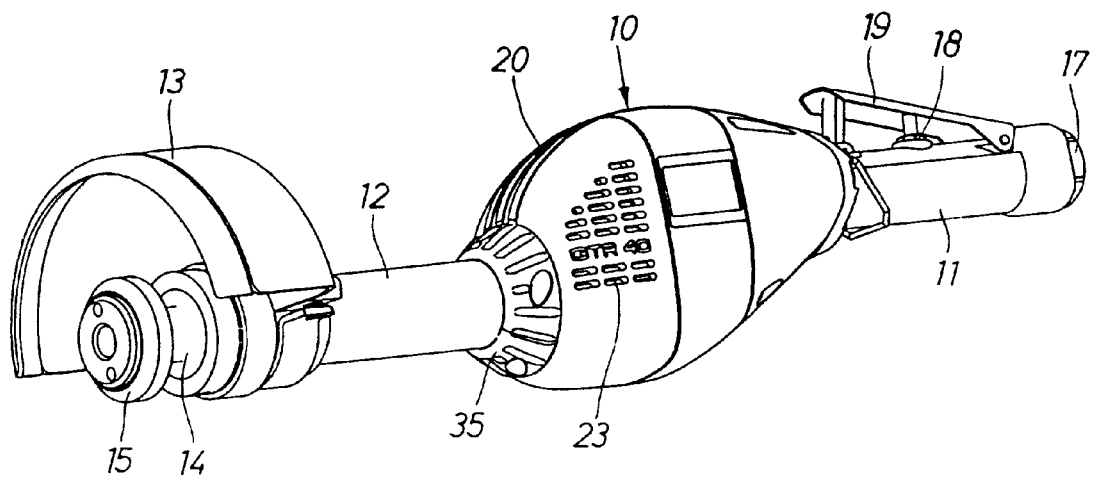
FIG. 2 shows another perspective view of the power tool in FIG. 1, illustrating the left hand side of the tool.
Figure 3:
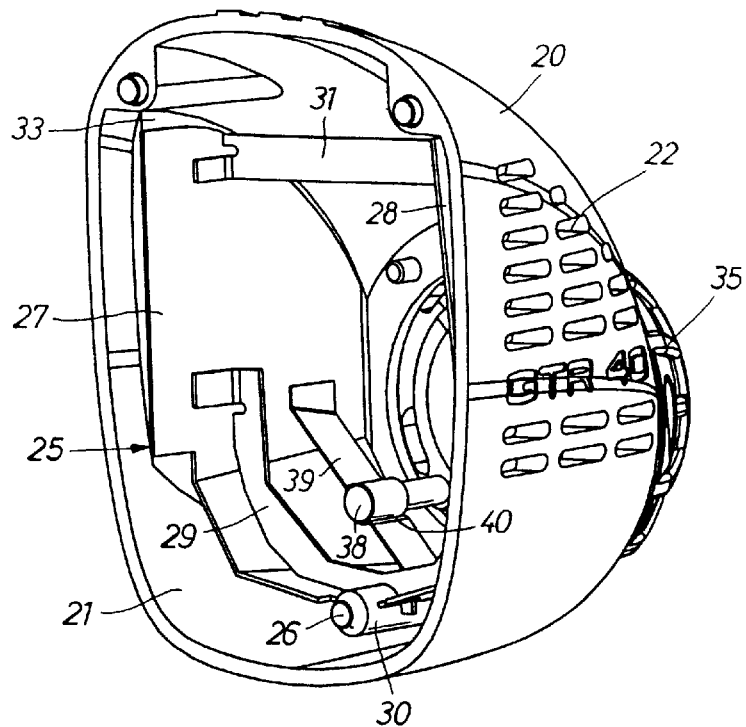
FIG. 3 shows a perspective view of a front housing part, including an air outlet flow directing valve.
Figure 4:
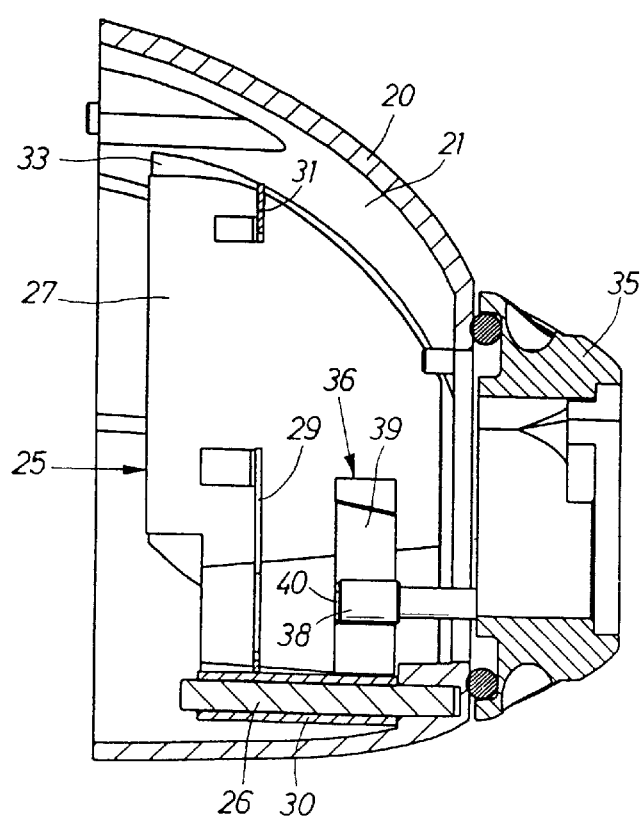
FIG. 4 shows a longitudinal section through the front housing part and flow directing valve as shown in FIG. 3.
Figure 5:
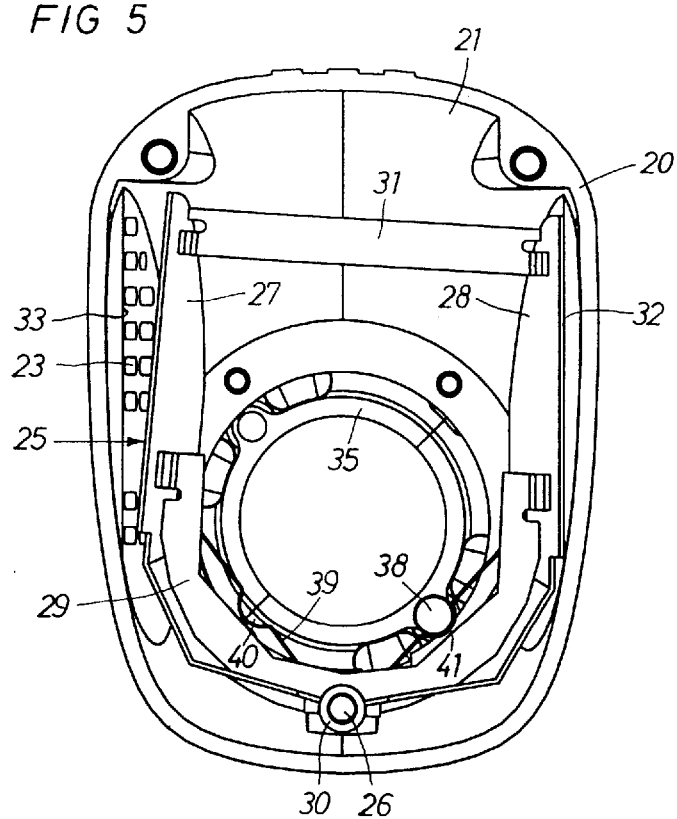
FIG. 5 shows a rear end view of the front housing part and flow directing valve as shown in FIGS. 3 and 4, illustrating the flow directing valve in one of its two alternative active positions.
Figure 6:
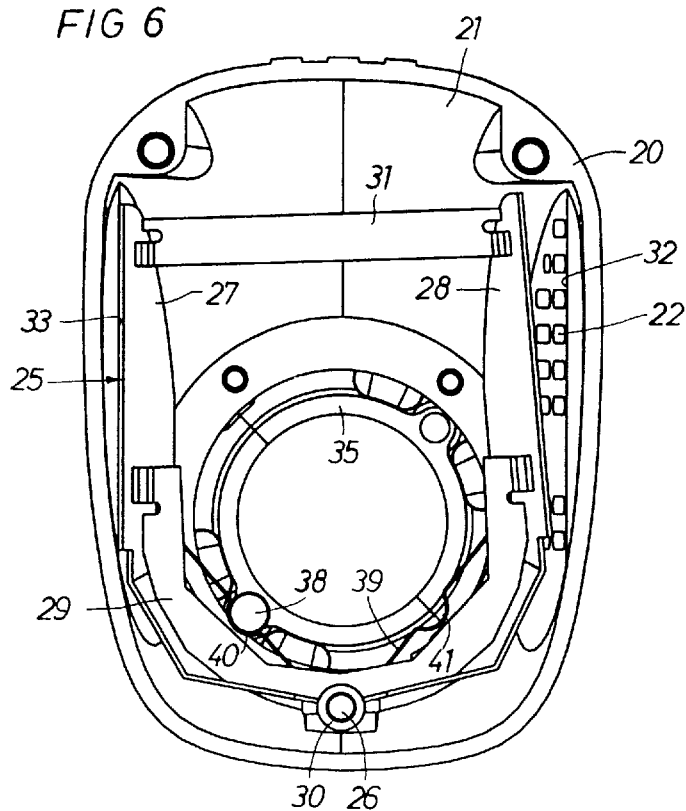
FIG. 6 shows a view similar to FIG. 5, but illustrates the flow directing valve in the other one of its two alternative active positions.

As shown in FIGS. 1 and 2, the grinder comprises a housing 10, a rear handle 11, a forward tubular neck portion 12 rigidly secured to the housing 10 and carrying a grinding wheel safe guard 13, and an output spindle 14 journalled in the neck portion 12. The output spindle 14 is provided with a mounting member 15 for attachment of a grinding wheel to the output spindle 14.

The handle 11 is the primary handle of the grinder and includes a pressure air conduit connection 17 and a throttle valve 18 for controlling the supply of motive pressure air to the grinder motor. The throttle valve 18 is maneouverable by a lever 19. During operation of the grinder, the neck portion 12 is used as a secondary handle.

The housing 10 comprises a front part 20 in which is enclosed an exhaust air outlet chamber 21. See FIGS. 3–6. The outlet chamber 21 communicates with the atmosphere via openings comprising a first opening section 22 located on the right hand side of the housing 10 and a second opening section 23 located on the left hand side of the housing 10. Each of these opening sections 22, 23 comprises a number of apertures disposed in rows.

Within the outlet chamber 21, there is a shiftable outlet flow directing valve 25. The latter is movably supported on a pivot 26 rigidly mounted in a parallel but offset disposition relative to the output spindle 14 and the neck portion 12. The valve 25 comprises two substantially flat flaps 27, 28, which are rigidly interconnected by a U-shaped yoke 29 in a spaced substantially parallel relationship to each other. See FIGS. 5 and 6. The yoke 29 comprises a sleeve portion 30 for movable support on the pivot 26. At their outer ends, the flaps 27, 28 are further interconnected by a rigid brace 31.

The two exhaust air outlet opening sections 22, 23 open into the outlet chamber 21 through two opposite and substantially flat inner walls 32, 33, which are arranged to be sealingly engaged by the valve flaps 27, 28, alternatively. In its wall engaging position, each valve flap 27, 28 covers all the apertures of the respective opening section 22, 23 to prevent the exhaust air from leaving the outlet chamber 21 therethrough.

For shifting the valve 25 between its outlet opening covering and uncovering positions, there is provided a control unit in the form of an annular handle 35 rotationally supported on the outside of the tubular neck portion 12, and a coupling device 36 for transferring the movement of the handle 35 to the valve 25. This coupling device 36 comprises a cam member in the form of an axially directed rod 38 rigidly secured to the handle 35, and a somewhat resilient V-shaped cam following profile 39 rigidly secured to the valve 25. The profile 39 comprises two indentations 40, 41 for partly receiving the cam rod 38, thereby defining the two alternative positions of the valve 25. See FIGS. 5 and 6.

In operation of the grinder, the air motor is powered by pressure air supplied via an air hose attached to the conduit connection 17 and via the throttle valve 18. To begin with, it is assumed that a grinding wheel is attached to the output spindle 14 and that the exhaust air outlet flow from the motor is ducted to the atmosphere through the outlet chamber 21 and the left hand side opening section 23. This means that the valve 25 is in the condition illustrated i FIG. 5 in which the flap 27 uncovers the apertures of the left outlet opening section 23, whereas the flap 28 covers the apertures of the right hand side outlet opening section 22. This condition of the valve 25 is properly maintained by the interengagement of the cam rod 38 and the indentation 41 of the cam profile 39.

Should the cold exhaust air outlet flow leaving the housing 10 through the left hand side opening section 23 be inconvenient, uncomfortable or even hazardous to the operator, he or she may easily change the outlet direction of the outlet flow by turning the handle 35. By doing so, the cam rod 38 is forced out of its engagement with the indentation 41 and rotated towards the opposite side of the V-shaped cam profile 39. When placed into contact with the cam profile 39, the cam rod 38 urges the valve 25 to its opposite active condition in which the flap 27 covers the apertures of the left hand side outlet opening section 23, whereas the flap 28 uncovers the right outlet opening section 22. At the end of this shifting movement the cam rod 38 snaps into a locking engagement with the indentation 40, thereby ensuring that the valve 25 is maintained in this new position. During this shifting movement the valve 25 is turned on the pivot 26.

Although the invention is described above in connection with a pneumatically powered power tool, it is to be understood that it could as well be applied to an electrically powered tool, because this type of tool also requires handling of a strong outlet air flow. This air flow is however, not of such low temperature as the exhaust air flow from a pneumatic motor, but still there may be certain situations and working positions where the cooling air outlet flow from an electrically powered tool may cause inconvenience and even trouble for the operator as described hereinabove in the Background of the Invention.

It is also to be understood that the structural design and particular arrangement of the outlet air flow valve is not limited to the shown and described example but can be freely varied within the scope of the claims. For example, the pivoting flap type of valve may be exchanged by a rotating or sliding type of valve.

We claim:
1. A power tool comprising:
a housing;
one of a pneumatic and an electric motor drivingly connected to an output spindle;
an air outlet passage provided in said housing, said air outlet passage including a first opening section located on one side of said housing, a second opening section located on another side of said housing, and a chamber provided in said housing;
an air outlet flow directing valve unit supported in said housing; and
a control unit for shifting said valve unit between a first condition in which the air outlet flow is directed through said first opening section only, and a second condition in which the air outlet flow is directed through said second opening section only;
wherein said valve unit comprises a first valve element arranged to cover and uncover said first opening section, and a second valve element arranged to cover and uncover said second opening section, said first valve element and said second valve element being rigidly interconnected and conjointly movable by said control member such that said first valve element covers said first opening section and said second valve element uncovers said second opening section when the valve unit is in said first condition, and such that said first valve element uncovers said first opening section and said second valve element covers said second opening section when the valve unit is in said second condition; and
wherein said control unit comprises a handle which is rotatably supported on said housing, a cam member connected to said handle and extending into said chamber, and a cam profile provided on said valve unit and arranged to be engaged by said cam member to shift said valve unit between said first condition and said second condition upon rotation of said handle.

2. The power tool according to claim 1, wherein said first and second valve elements are located in said chamber and are jointly supported on a pivot mounted in said chamber.

3. The power tool according to claim 2, wherein said handle is annular in shape and rotatively supported in a coaxial relationship with said output spindle.

4. The power tool according to claim 3, wherein said first opening section and said second opening section each comprise a number of apertures penetrating respective substantially flat wall portions of said chamber, and said first valve element and said second valve element each have a substantially flat shape for sealing contact against said respective substantially flat wall portions.

5. The power tool according to claim 2, wherein said first opening section and said second opening section each comprise a number of apertures penetrating respective substantially flat wall portions of said chamber, and said first valve element and said second valve element each have a substantially flat shape for sealing contact against said respective substantially flat wall portions.

6. The power tool according to claim 1, wherein said handle is annular in shape and rotatively supported in a coaxial relationship with said output spindle.

7. The power tool according to claim 6, wherein said first opening section and said second opening section each comprise a number of apertures penetrating respective substantially flat wall portions of said chamber, and said first valve element and said second valve element each have a substantially flat shape for sealing contact against said respective substantially flat wall portions.

8. The power tool according to claim 1, wherein said first opening section and said second opening section each comprise a number of apertures penetrating respective substantially flat wall portions of said chamber, and said first valve element and said second valve element each have a substantially flat shape for sealing contact against said respective substantially flat wall portions.

9. A power tool comprising:

a housing;

one of a pneumatic and an electric motor drivingly connected to an output spindle;

an air outlet passage provided in said housing, said air outlet passage including a first opening section located on one side of said housing, a second opening section located on another side of said housing, and a chamber provided in said housing;

an air outlet flow directing valve unit supported in said housing; and a control unit for shifting said valve unit between a first condition in which the air outlet flow is directed through said first opening section only, and a second condition in which the air outlet flow is directed through said second opening section only;

wherein said valve unit comprises a first substantially flat valve flap arranged to cover and uncover said first opening section, and a second substantially flat valve flap arranged to cover and uncover said second opening section, said first valve flap and said second valve flap being rigidly interconnected and conjointly movable by said control member such that said first valve flap covers said first opening section and said second valve flap uncovers said second opening section when the valve unit is in said first condition, and such that said first valve flap uncovers said first opening section and said second valve flap covers said second opening section when the valve unit is in said second condition.

10. The power tool according to claim 9, wherein said first and second valve flaps are located in said chamber and are jointly supported on a pivot mounted in said chamber.

11. The power tool according to claim 10, wherein said control unit comprises a handle which is rotatably supported on said housing, a cam member connected to said handle and extending into said chamber, and a cam profile provided on said valve unit and arranged to be engaged by said cam member to shift said valve unit between said first condition and said second condition upon rotation of said handle.

12. The power tool according to claim 11, wherein said handle is annular in shape and rotatively supported in a coaxial relationship with said output spindle.

13. The power tool according to claim 12, wherein said first opening section and said second opening section each comprise a number of apertures penetrating respective substantially flat wall portions of said chamber, and said first valve element and said second valve element each have a substantially flat shape for sealing contact against said respective substantially flat wall portions.

14. The power tool according to claim 11, wherein said first opening section and said second opening section each comprise a number of apertures penetrating respective substantially flat wall portions of said chamber, and said first valve element and said second valve element each have a substantially flat shape for sealing contact against said respective substantially flat wall portions.

15. The power tool according to claim 10, wherein said first opening section and said second opening section each comprise a number of apertures penetrating respective substantially flat wall portions of said chamber, and said first valve element and said second valve element each have a substantially flat shape for sealing contact against said respective substantially flat wall portions.

16. The power tool according to claim 9, wherein said control unit comprises a handle which is rotatably supported on said housing, a cam member connected to said handle and extending into said chamber, and a cam profile provided on said valve unit and arranged to be engaged by said cam member to shift said valve unit between said first condition and said second condition upon rotation of said handle.

17. The power tool according to claim 16, wherein said handle is annular in shape and rotatively supported in a coaxial relationship with said output spindle.

18. The power tool according to claim 17, wherein said first opening section and said second opening section each comprise a number of apertures penetrating respective substantially flat wall portions of said chamber, and said first valve element and said second valve element each have a substantially flat shape for sealing contact against said respective substantially flat wall portions.

19. The power tool according to claim 16, wherein said first opening section and said second opening section each comprise a number of apertures penetrating respective substantially flat wall portions of said chamber, and said first valve element and said second valve element each have a substantially flat shape for sealing contact against said respective substantially flat wall portions.

20. The power tool according to claim 9, wherein said first opening section and said second opening section each comprise a number of apertures penetrating respective substantially flat wall portions of said chamber, and said first valve element and said second valve element each have a substantially flat shape for sealing contact against said respective substantially flat wall portions.

* * * * *